United States Patent [19]
Bartok et al.

[11] Patent Number: 4,535,931
[45] Date of Patent: Aug. 20, 1985

[54] ENERGY CONSERVING WATER HEATER CONTROL SYSTEM

[75] Inventors: Stephen Bartok, Rancho Palos Verdes; Benjamin H. Stansbury, Jr., Beverly Hills; Alan L. Backus, Los Angeles, all of Calif.

[73] Assignee: Kenneth W. Scott, Coronado, Calif.

[21] Appl. No.: 531,998

[22] Filed: Sep. 14, 1983

[51] Int. Cl.³ .............................................. F23N 1/08
[52] U.S. Cl. .............................. 236/20 R; 236/91 F; 126/351; 126/361; 126/374; 219/330
[58] Field of Search ............... 126/351, 362, 361, 374; 219/327, 328, 329, 330, 331, 337, 310, 515, 510; 236/20 R, 47, 91 F

[56] References Cited

U.S. PATENT DOCUMENTS

| | | | |
|---|---|---|---|
| 4,090,663 | 5/1978 | Bonne et al. | 236/91 F X |
| 4,166,944 | 9/1979 | Scott | 126/362 X |
| 4,413,775 | 11/1983 | Scott | 236/20 R |

FOREIGN PATENT DOCUMENTS

| | | | |
|---|---|---|---|
| 2358754 | 5/1975 | Fed. Rep. of Germany | 236/91 F |
| 58-129515 | 8/1983 | Japan | 236/20 R |

*Primary Examiner*—Margaret A. Focarino
*Attorney, Agent, or Firm*—Ralph S. Branscomb

[57] ABSTRACT

Water temperature sensors in the form of thermisters are in physical thermal contact with the inlet and outlet pipes of a water heater and may be surrounded by insulating material to make them more insensitive to the ambient air temperature and more sensitive to the temperature of the respective water pipes and the water contained therein. These two thermisters are connected in a bridge circuit connected to an operational amplifier whose output will be of a given polarity only if the measured temperature difference exceeds a predetermined value. The operational amplifier's output is then used to adjust the effective thermostatic setting of the hot water heater in a two-valued control arrangement. Alternatively, each of the two water temperature sensors may assume a purely mechanical form, such as an enclosed volume of fluid or plastic material operating a bellows or piston arrangement, so that at higher temperatures the volume increases and the bellows or piston moves in one direction while at lower temperatures, the volume decreases, and the bellows or piston moves in an opposite direction. If two such mechanical sensor arrangements are connected to work in opposition to one another through appropriate spring linkages, the resultant mechanical movement is proportional to the difference in sensor temperatures and adjusts the thermostat setting of the heater in a proportional form of control.

9 Claims, 4 Drawing Figures

ENERGY CONSERVING WATER HEATER CONTROL SYSTEM

FIELD OF THE INVENTION

The present invention relates generally to water heater control systems and more particularly to an improved energy conserving heater control system which reduces heat transfer losses by allowing the temperature of the heated water to be maintained at a lower temperature when the heater is in a standby mode than is the case when the heater is in a high demand mode and which functions without any recalibration under a wide variety of field conditions.

BACKGROUND OF THE INVENTION

Thermal efficiency has always been an important consideration in the design and operation of water heaters. This is even more so the case today when the cost of energy continues to climb and its availability can no longer be assumed to be without limit.

The efficient use of the energy source to heat the water has two distinct aspects. The first is the efficient transfer of the heat energy from the heat source to the water being heated; the second is the maintenance of the water inside the water heater at its heated temperature with as little heat as possible being transferred from the water heater and the water contained therein to the surrounding environment.

The present invention is concerned primarily with the second aspect, that is to say, the minimization of heat losses from the water heater to the surrounding environment.

As is well known, the rate of heat transfer from a water heater to the surrounding environment, whether it be by convention, conduction or radiation, is always dependent upon a temperature difference.

In the case of a conventional electric water heater, the heat transfer loss (otherwise known as "standby power consumption") is a linear function of the difference between the mean ambient air temperature and the mean heated water temperature, with the coefficient being related only to the thermal integrity of the outer shell of the heater. Thus, in the case of an electric water heater, there are several ways to reduce the heat loss: (1) increase the shell insulation surrounding the water heater water tank, (2) install the water heater in a relatively warm location, and (3) operate the water heater at a water temperature that is as cool as possible (although in that regard, it should be noted that the average household requires hot water of at least 140° F. for the proper operation of automatic dishwashers and other water consuming appliances).

In the case of conventional gas water heaters, similar factors apply; however, a gas water heater utilizes the ambient surrounding air for the combustion of the gas and the resultant exhaust gases must be vented through a flue, causing an additional loss of heat and energy. These flue losses are dominated by natural convection which varies approximately with the 1.3 power of the difference between the mean ambient air temperature and the mean heated water temperature. By employing an automatic flue or vent damper (which restricts the flue passageway inside the water heater tank or the vent passageway located above the heater—at least while the water heater is in a standby mode with the burner off and only the pilot in operation), the flue losses in a gas water heater can be somewhat minimized; however, it can be said that a gas heater will be more sensitive to the difference between the mean water temperature inside the heater and the temperature of the surrounding ambient air than is ture for an electric water heater (or other unvented water heater not utilizing combustion to heat the water).

In recognition of the foregoing basic physical principles, modern energy saving water heaters are provided with better insulation than their predecessors and consumers are encouraged to operate the heaters at a lower water temperature and to pay greater care to the heater's location and installation. Additionally, it is now possible to purchase insulation blankets for installation on older water heaters and to purchase damper kits for installation of automatic flue or vent dampers on gas water heaters.

Furthermore, it has been proposed to provide the water heater with an automatic control system to lower the operating temperature to which the hot water is heated during periods of low hot water demand and to raise the temperature back up during periods of high demand in response to signals from either a single temperature sensor connected to the hot water outlet pipe or from both such an outlet sensor and a second temperature sensor on the cold water inlet pipe, with the latter sensor acting as a veto switch for preventing the heater from erroneously switching into a high demand mode when a low demand situation has actually remained in effect for several hours, as taught by Scott U.S. Pat. Nos. 4,016,402 and 4,166,944, respectively.

The theory behind employing two different operating temperatures in the same water heater installation, a lower standby (or low demand) temperature and a higher operational (high demand) temperature, is that in the typical residential or commercial application, the hot water heater is called upon to supply hot water in quantity only during certain times of the day—for instance, in the morning when the family is waking up and undergoing their morning toilet; in the mid-morning when the automatic clothes washer is in operation, and in the early evening when the dishwasher has been put into operation following the evening meal. During such periods of high demand, relatively hot water is required to be output by the hot water heater; first of all, to provide the high sanitizing temperatures required by automatic washing machines and dishwashers; secondly, to increase the effective capacity of the heater by permitting a greater amount of cold water to be mixed with the hot water heater's output when lukewarm rather than hot water is all that is required.

However, the nature of the particular water heater being used, the location which it is installed in, whether the plumbing is of copper or iron, the climatic conditions, the season of the year, whether the hot water supply system is of a forced recirculating type, of a convection recirculating type, or a nonrecirculating type, the temperature of the cold water as supplied by the water company, and other similar considerations all obviously affect the temperature to which the temperature sensor on the output pipe should be set (and, if employed, the temperature on the cold water inlet pipe), in order to optimize the energy saving and to minimize any inconvenience to the consumer.

BRIEF SUMMARY OF THE INVENTION

Briefly, the present invention improves upon the prior art by employing thermal sensors connected to both the inlet and outlet pipes in a water heater control system configuration which is responsive not to the particular absolute temperature measured by either sensor, but rather to the difference in the respective sensor measurements.

It has been found experimentally that when this difference is very slight, then the water heater is no longer subject to a high hot water demand situation, but rather is in a steady-state low demand standby mode and accordingly, the setting of the water heater thermostat may be lowered (with the predictable resultant savings in energy) without any apparent inconvenience to the consumer. On the other hand, when the difference in temperatures is relatively great (the inlet pipe being relatively cool and the outlet pipe being warm to hot), then clearly the water heater is experiencing a high hot water demand situation, and adjustment of the water temperature thermostat to a higher setting will result in the consumer having available both hotter water and a higher volume of warm water in accordance with his requirements.

In a first type of preferred embodiment, the water temperature sensors take the form of thermisters in physical thermal contact with the heater inlet and outlet pipes and are surrounded by insulating material (to make them more insensitive to the ambient air temperature and more sensitive to the temperature of the respective water pipes and the water contained therein). These two thermisters are connected in a bridge circuit connected to an operational amplifier whose output will be of a given polarity only if the measured temperature difference exceeds a predetermined value. The operational amplifier's output is then used to adjust the effective thermostatic setting of the hot water heater in a two-valued control arrangement.

In a second type of preferred embodiment, the water temperature sensors each assume a purely mechanical form, such as an enclosed volume of fluid or plastic material which includes a bellows or piston arrangement, so that at higher temperatures the volume increases and the bellows or piston moves in one direction while at lower temperatures, the volume decreases, and the bellows or piston moves in an opposite direction.

If two such mechanical sensor arrangements are connected to work in opposition to one another through appropriate spring linkages, the resultant mechanical movement is proportional to the difference in sensor and temperatures and may adjust the thermostatic setting of the heater in a proportional form of control.

BRIEF DESCRIPTION OF THE DRAWINGS

For a better understanding of the present invention, reference is made to the following detailed description of one or more preferred embodiments and the appended drawings in which.

DETAILED DESCRIPTION

Figure 1:
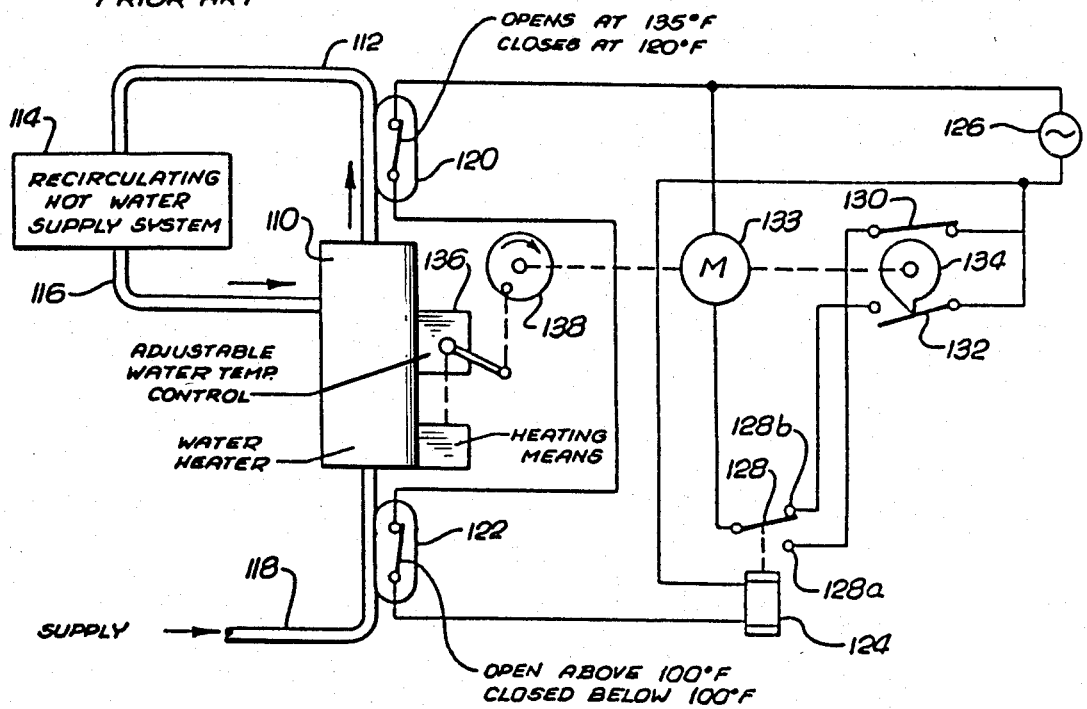
FIG. 1 depicts (partially in schematic and block diagram format) a water heater control system of the prior art employing two thermostatic switches and an electromechanical arrangement to adjust the water temperature control of a conventional water heater.

FIG. 1 represents a system constructed in accordance with teachings of the aforementioned Scott U.S. Pat. No. 4,166,944 in which a conventional water heater 110 has its hot water outlet pipe 112 connected to a recirculating hot water supply system (indicated by the block 114) whose return to the heater 110 is via hot water return pipe 116. The heater's inlet supply pipe (shown at reference numeral 118) is for the purpose of supplying the hot water heater 110 with cold water from the main water supply (not shown) as hot water is used up in the hot water supply system 114.

Attached to, and in thermal contact with, hot water outlet pipe 112 is a thermostat sensor switch 120 having a wide temperature differential (for example, opening at 135° F. and closing at 120° F.), while in thermal contact with cold water supply inlet pipe 118 is a second thermostatic sensor 122 (opening, in this example, above 100° F. and closing below 100° F.).

A source of low voltage AC power is shown schematically at reference numeral 126. The output from this voltage source (assuming both thermostatic switches 120 and 122 are closed, indicating that the inlet pipe 118 is below 100° F. and the outlet pipe temperature is below 135° F. and therefore suggesting that the water heater 110 is experiencing a relatively high demand for hot water and has not fully recovered therefrom) results in moveable contact 128 of relay 124 being closed against the lower fixed contact 128a, thus routing the supply of voltage to motor 133 through upper leaf contact 130, which in turn results in motor 133, water temperature control adjusting mechanism 138, and electrical contact cam 134 all to be rotated until cam 134 has opened contact 130, said upper leaf thereby cutting off the flow of electricity to motor 133.

When either inlet sensor 122 or outlet sensor 120 is open (indicating respectively that the cold water inlet pipe temperature has risen above 100° F., or that the hot water outlet pipe temperature has risen above 135° F., either of which conditions suggesting that the water heater 110 has essentially recovered from a high demand for hot water previously made of it and is now in a low hot water demand (standby) situation), then the supply of voltage to relay 124 is interrupted and relay moveable contact 128 closes against upper contact 128b and the power to motor 133 is now routed through lower leaf contact 132, thereby causing the motor 133 and the adjusting mechanism 138 and the cam 134 all to rotate approximately 180° and the water temperature control 136 of the water heater 110 to be set to a lower (standby) energy saving temperature.

As should be apparent from the proceeding comments, such a prior art hot water heater control system requires that the cold water inlet pipe temperature sensor 122 and the hot water outlet pipe temperature sensor 120 both be appropriately calibrated to the working temperatures expected to be encountered in the particular installation. In a relatively cold climate, obviously the temperature of the inlet pipe temperature will be considerably lower than would otherwise be the case, especially when even a small amount of cold water is flowing through the pipe into the water heater. Indeed, the temperature of the cold water supply pipe to a hot water heater installed in an unheated, relatively drafty location in a cold climate on a winter's day could normally be expected to be below 100° F. most of the time. On the other hand, in a recirculating type hot water system, the temperature experienced by hot water outlet pipe sensor 120 should be essentially equal to the temperature of the water inside water heater 110, especially with the portions of sensor 120 mounting not in thermal contact with outlet pipe 112 suitably insulated from the surrounding ambient temperature. On the other hand, in a nonrecirculating system, the temperature experienced by outlet pipe sensor 120 will clearly be much lower than that of the water inside water heater 110, especially if the sensor is not mounted immediately above and next to water heater 110, outlet pipe 112 is made of galvanized iron and has a relatively large radiating surface, the pipe passes through a relatively cold space, and there is not hot water presently circulating through the pipe because there is no demand for hot water being made of the water heater.

Figure 2:
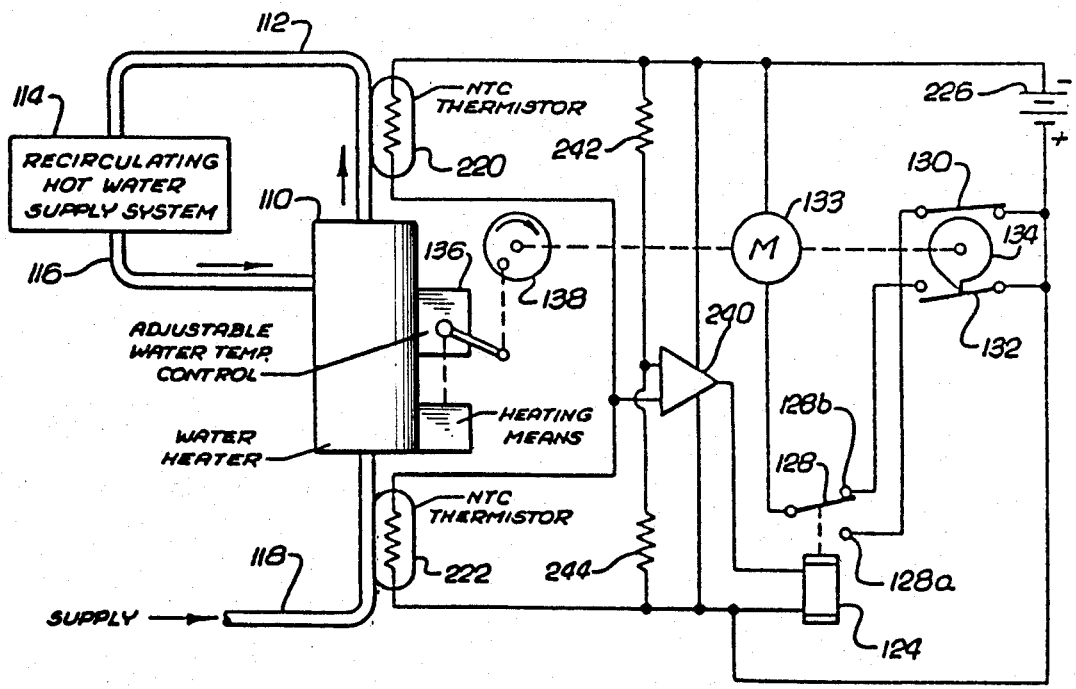
FIG. 2 illustrates (partially in schematic and block diagram format) a first type of preferred embodiment of the present invention in which the thermostatic switches of FIG. 1 have been replaced by thermisters connected together in a circuit bridge so as to be responsive to the difference in temperature sensed thereby.

By the way of contrast, in the embodiment of the present invention shown in FIG. 2, the need for accurate calibration (or recalibration) of the thermostatic temperature sensors 120 and 122 of the prior art has been avoided and instead of opened or closed thermostatic switches, hot water outlet pipe sensor 220 and cold water inlet pipe 222 comprise thermisters—electronic devices having no moving parts and which may be expected to maintain their calibration over extended intervals of time (A thermister is a resistance element whose resistance is a function of its temperature.).

In a typical commercially available negative temperature coefficient (NTC) thermister, resistance will be perhaps on the order of 200,000 ohms at 77° F. and 100,000 ohms at 100° F. Thus, when the two thermisters 220 and 222 are both at the same temperature, it may be assumed that they both will have the same resistance. On the other hand, if they differ in temperature by only 23° F., one being at 77° and the other being at 100°, then their respective resistances will differ in the ratio of 1:2.

Referring now with particularity to the particular circuit shown in FIG. 2, it may be seen that outlet pipe thermister 220 has one of its terminals connected to the negative side of a DC power supply 226, the positive side of said water supply being connected to a terminal of cold water inlet pipe thermister 222. The other terminals of outlet thermister 220 and of inlet thermister 222 are connected together and comprise one input to an operational amplifier (shown schematically at reference 240). The other input to the control amplifier is the common terminal of the two fixed resistances 242 and 244 which are connected to each other in series across DC power supply 226, thereby supplying a reference voltage at approximately half the full potential across the power supply 226.

Operational amplifier 240 has its supply voltage connections connected directly to DC voltage source 226. Its output is a signal which is of one polarity (for example, negative) when output pipe thermister 220 senses a temperature considerably above that sensed by inlet pipe thermister 222 and accordingly outlet thermister 220 has a lower resistance with the result that the voltage potential appearing at the common thermister input to operational amplifier 240 is measurably more negative than the reference potential appearing at the common connection between reference resistances 242 and 244.

On the other hand, if inlet pipe thermister and outlet pipe thermister 220 sense roughly comparable temperatures (suggesting that the water heater 110 is experiencing a zero-demand situation, and has fully recovered from any prior high demand situation, so that the hot water inside the heater has actually expanded and flowed backwards into inlet supply pipe 118 thereby heating up inlet sensor 222 to the temperature of the water inside the water heater, the potential applied to operational amplifier from the common connection of the two thermisters is about half that of power supply 226, and this is in turn approximately equal to the potential at the common connection of the two reference resistances 242 and 244.

As a practical matter, the relative resistances of resistances 242 and 244 should be selected such that under such circumstances, the potential at the common connection of the thermisters 220 and 222 is consistently greater than the potential at the common connection of these two resistances, with the result that the output from operational amplifier 240 will consistently be of the other polarity (positive, in the case of the present example). In any event, in the standby mode, no current will flow through relay 124 (since the other terminal of relay 124 is already connected to the positive side of the power supply), relay contact 128 is electrically connected to contact 128b, thereby routing current to the motor 133 through lower contact 132 and adjuster 136 is set to lower setting, as was also the case of the prior art system described in connection with FIG. 1.

Although the energy source for the control system shown in FIG. 2 is schematically shown in the form of a multi-celled battery providing a direct current voltage at a relatively low potential (say, 6 or 9 volts), it is clear that the standard household 120 volt AC wiring may be used as the voltage source, preferably stepped down by means of an isolating transformer to a relatively safe low potential (on the order of 6 volts). By using a low voltage, any possibility of fatal electric shock to the consumer should be avoided, even if the water heater is located in a damp environment and even if some or all of the electrical components of the control system have been improperly installed, such that the operational voltage is exposed to the consumer. The output of such a step-down transformer can be converted to direct current (required for the proper operation of operational amplifier 240) by means of a single rectifying diode (for a half wave configuration) or a pair of rectifying diodes, (for a full wave configuration), preferably in combination with a filtering network comprising one or more capacitors. In any event, the construction of the power supply need not depart from conventional practices.

As shown in FIGS. 1 and 2, the control for the water heater temperature 136 is adjustable by means of an exposed lever protruding from the control box 136. Usually water heaters are not equipped with such a protruding lever, but possibly with circular knobs or the like. However, in the case of such a water heater, it clearly would be possible to remove the knob from the shaft upon which it rotates and to replace the knob with a lever similar to that shown in the Figures. On the other hand, it would also be possible to construct some form of adapter to connect the particular knob with knob operating linkage shown at 138. Co-pending application Ser. No. 446,884, entitled "Hot Water Heater Knob Adapter", assigned to the same assignee as is the present invention, discloses a universal adapter which is particularly useful in the practicing of the present invention and which has the additional important advantage of being suitable for use with essentially all water heater temperature controllers utilized on residential gas water heaters commercially available in the United States, and the teachings of said application are accordingly incorporated herein by reference.

Needless to say, other modifications to the control system shown in FIG. 2 may also be readily apparent to those skilled in the art without departing from the scope and spirit of the present invention. However, in order to provide a more complete description of the present invention and its possible applications, additional and further embodiments will also be described which may also contain features and functions that might not otherwise be apparent or obvious to those skilled in the art.

Figure 3:
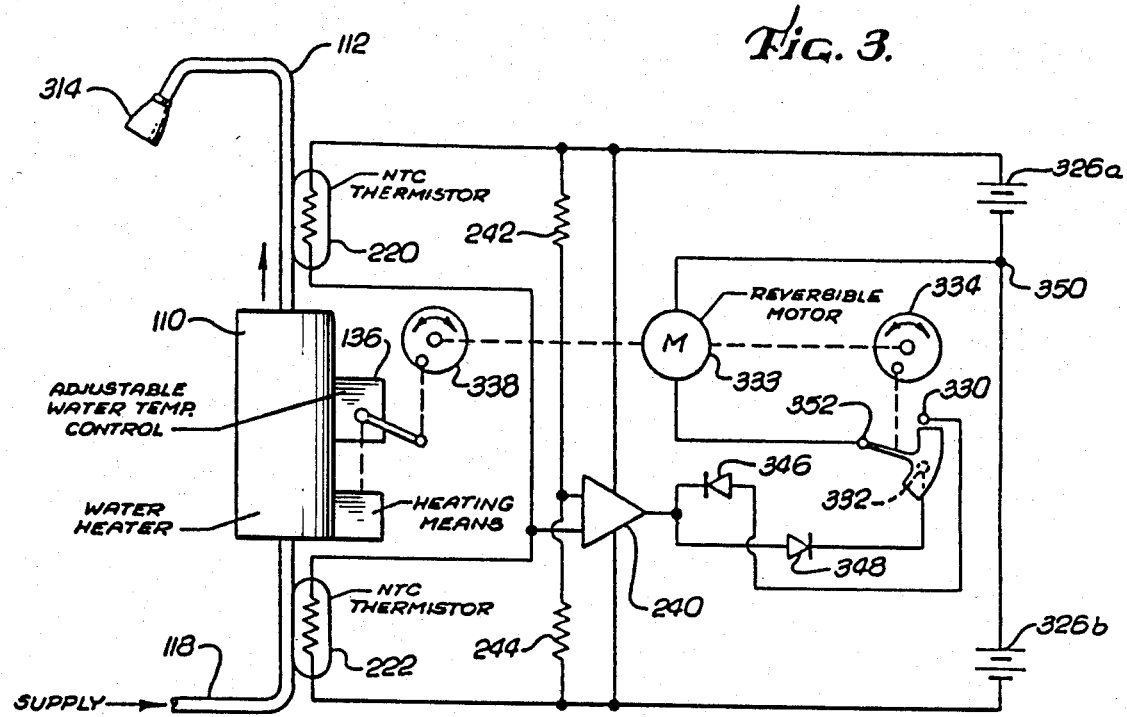
FIG. 3 illustrates an alternate preferred embodiment to that of FIG. 2 in which the recirculating hot water supply system has been replaced by a non-recirculating supply system and in which the relay and cam electromechanical adjusting arrangement of FIGS. 1 and 2 has been replaced by an electromechanical arrangement employing a reversible motor connected to a double throw switch.

FIG. 3 shows one such alternate embodiment. It is closely related to the embodiment shown in FIG. 2, in that it also employs temperature sensitive resistances (such as the aforementioned NTC thermisters) in a bridge circuit connected to an operational amplifier. Indeed, the only difference between the elements shown in FIG. 3 under reference numerals 220, 222, 240, 242 and 244 (the temperature sensors, the operational amplifier and the reference voltage resistances,) is that the values of the two reference resistances 242 and 244 should be chosen to ensure that in the standby mode the output from operational amplifier 240 is full scale positive, since one of the more notable differences between the system shown in FIG. 2 and the system shown in FIG. 3 is that the latter system employs a reversible motor 333, one lead thereto being connected to the center tap 350 of the power supply 326a and 326b, and the other lead of said motor is connected via a double throw switch arrangement (shown diagramatically as a rotating segment element terminal 352), which makes contact either with negative terminal 330 connected through diode 346 to the output of operational amplifier 240 and having a voltage impressed thereon only if the output of operational amplifier 240 is negative, or alternatively with positive contact 332 which is connected to the positive side of second diode 348 also connected to the output of operation amplifier 240 and on which a voltage is impressed only if the output of operational amplifier 240 is positive. The switch arrangement shown is of the type known as make-before-break; that is to say, contact 352 may be connected both to terminal 332 and to terminal 330, but in that event there is no malfunction or short circuit, since the output of operational amplifier 240 cannot be both positive and negative at the same time, thus only one of the two terminals 330 or 332 may have a voltage impressed on it.

Another difference between the system shown in FIG. 3 and that shown in FIG. 2 is that the recirculating hot water supply system 114 and hot water return pipe 116 of FIG. 2 had been replaced by a non-recirculating system shown schematically in FIG. 3 in the form of a shower head 314. Comments previously made with respect to FIG. 2 concerning the possibility of other readily apparent modifications not shown and described herein explicitly apply with equal force to the system of FIG. 3.

Figure 4:
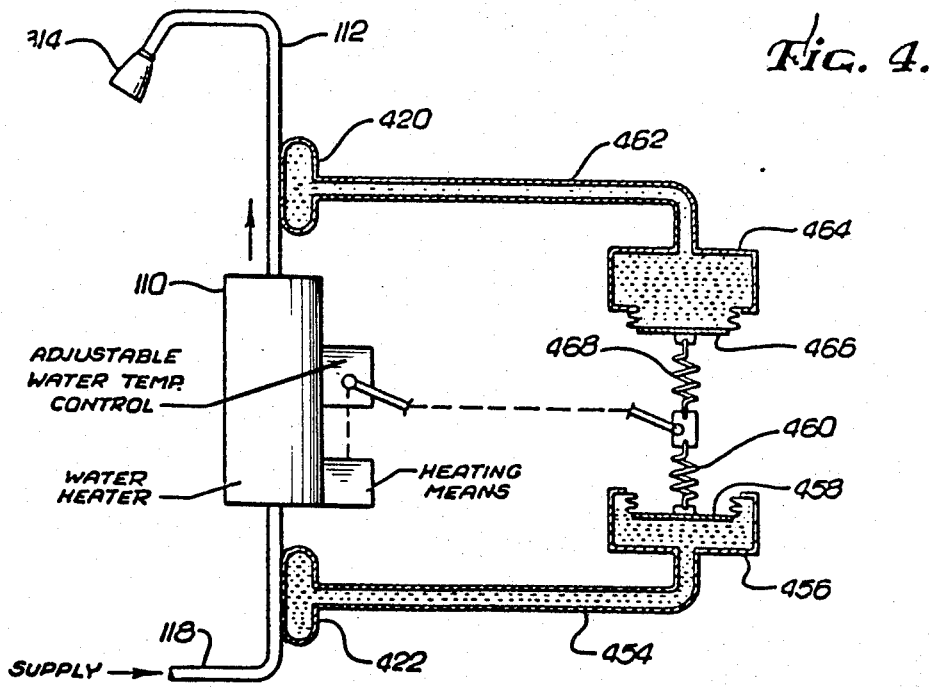
FIG. 4 illustrates, somewhat schematically, a purely mechanical analog to the adjusting arrangement of FIG. 3 which gives a proportional control adjustment.

FIG. 4 depicts a second type of preferred embodiment which differs substantially from the embodiments shown in FIGS. 3 and 2, not only in that it utilizes no electronic or electromechanical elements (but rather only mechanical elements), but also in that it is a proportional rather than a two-valued control system.

Referring now specifically to FIG. 4, it may be seen that cold water inlet pipe thermister 222 of FIGS. 2 and 3 have been replaced by a reservoir 422 continuing a temperature responsive fluid or plastic material which expands in volume when heated, reservoir 422 being connected by means of conduit 454 to bellows 456 which has a diaphram 458 to which is connected a spring 460 which is mechanically coupled to the control lever protruding from water temperature controller 136. On the hot water outlet pipe, hot water outlet temperature thermister 220 has been replaced by an outlet pipe temperature sensing reservoir 420 in thermal contact with outlet pipe 112, outlet reservoir 420 in turn being connected by a suitable conduit 462 to a second bellows arrangement 464 which has a second diaphram 466 connected by means of a second spring 468 also to the same adjusting lever of controller 136.

In the situation shown in the drawings, outlet pipe hot water temperature sensor bellows 464 is in an expanded condition relative to the contracted condition of cold water inlet temperature sensor bellows 456, indicating that the water heater is not in a low or zero demand standby condition in which the temperature of both its inlet and outlet pipes is more or less the same, but rather is in a moderate to high demand condition in which hot water is being drawn from the water heater and is being replaced by cold water from the water company supply lines. Accordingly, the thermostat control 136 of the water heater is automatically set by the mechanical arrangement to a higher temperature setting, thereby increasing the availability of hot water to the consumer and minimizing recovery time.

If, on the other hand, the temperature in the vicinity of inlet pipe reservoir 422 and outlet pipe sensing temperature reservoir 420 were essentially equal, then both inlet bellows 456 and outlet bellows 464 would be expanded (or contracted) in approximately the same amounts, and the lever on water temperature control 136 would be pulled up from the illustrated position to a lower standby temperature setting.

Since the two mechanical sensor arrangements are connected to work in opposition to one another through a flexible spring linkage, the resultant position of the thermostat control is proportional to the difference in their temperatures.

Although not specifically shown in the Figures, water heater temperature control 136 (as for example, in the case of an electric water heater), may also take the form of a purely electric or electronic device which may accordingly be directly responsive to the output of operational amplifier 240 without any intervening mechanical or electromechanical components (such as relays, motors, cams, rotary switches, and mechanical linkages) being required.

Although the present invention has been described herein with particular reference to several preferred embodiments described in detail, clearly such detailed descriptions should not be deemed to limit the scope of any patent to be granted hereon, but rather such scope is to be construed in accordance with the claims attached to the patent when it issues.

What is claimed is:

1. An improved energy conserving water heater control system of the type having a water temperature control associated with the water heater adjustable to a warmer high demand setting and to a cooler energy saving standby setting, and having temperature sensors monitoring temperatures in thermal contact with an inlet pipe to said water heater and with an outlet pipe from said heater, wherein the improvement comprises:
   a difference measuring arrangement connected between the inlet sensor and the outlet sensor; and
   an adjusting means responsive to the difference measured by said arrangement for setting said control, when said difference approaches zero, to said cooler setting, and for setting said control, when the temperature sensed by said outlet sensor is substantially greater than the temperature sensed by said inlet sensor, to said warmer setting.

2. The improved system of claim 1, wherein said inlet and outlet sensors are thermisters, and wherein said difference measuring arrangement comprises:
   an operational amplifier having one input connected to both of said thermisters; and
   a pair of resistances connected to a second input of said operational amplifier,
   said operational amplifier outputting a signal of a first polarity only when the difference in the temperatures sensed by said inlet sensor and by said outlet sensor approaches zero.

3. The improved system of claim 2, wherein said operational amplifier will output a signal of a second polarity only when the temperature sensed by said inlet sensor is substantially less than the temperature sensed by said outlet sensor.

4. The improved system of claim 2, wherein the output signal from said operational amplifier determines at what position an electrically driven mechanism mechanically connected to said adjusting means stops its rotation.

5. The improved system of claim 4, wherein an electric motor driving said mechanism receives its power through one of two switches which are either open or closed in response to the position of a cam means comprised within said mechanism.

6. The improved system of claim 4, wherein said motor driving said mechanism is reversable from a first direction to second direction in accordance with the polarity of the output from said operational amplifier.

7. The improved system of claim 6, wherein said motor receives its power through a make-before-break switch.

8. The improved system of claim 1, wherein said sensors, said difference measuring arrangement, and said adjusting means all operate mechanically (i.e., without electricity).

9. The improved system of claim 8, wherein each of said sensors comprises a reservoir containing a temperature responsive material which expands in volume when heated.

* * * * *